United States Patent
Tran et al.

(10) Patent No.: US 7,393,511 B2
(45) Date of Patent: Jul. 1, 2008

(54) AMMONIA OXIDATION CATALYST FOR THE COAL FIRED UTILITIES

(75) Inventors: Pascaline Harrison Tran, Holmdel, NJ (US); Gerard Diomede Lapadula, Piscataway, NJ (US); Xinsheng Liu, Edison, NJ (US)

(73) Assignee: BASF Catalysts LLC, Iselin, NJ (US)

( * ) Notice: Subject to any disclaimer, the term of this patent is extended or adjusted under 35 U.S.C. 154(b) by 438 days.

(21) Appl. No.: 11/058,822

(22) Filed: Feb. 16, 2005

(65) Prior Publication Data

US 2006/0182676 A1  Aug. 17, 2006

(51) Int. Cl.
*B01D 53/56* (2006.01)
*B01D 53/58* (2006.01)

(52) U.S. Cl. .................... 423/237; 423/239.1
(58) Field of Classification Search ........... 423/237, 423/239.1
See application file for complete search history.

(56) References Cited

U.S. PATENT DOCUMENTS

| | | | |
|---|---|---|---|
| 2,801,898 A | 8/1957 | Marcus | |
| 3,812,236 A | 5/1974 | Adams et al. | |
| 4,003,978 A | 1/1977 | Shiraishi et al. | |
| 4,169,814 A * | 10/1979 | Inaba et al. ........... | 502/230 |
| 4,179,412 A | 12/1979 | Inaba et al. ........... | 252/472 |
| 4,302,431 A | 11/1981 | Atsukawa et al. | |
| 4,419,274 A | 12/1983 | Sin et al. | |
| 4,758,250 A | 7/1988 | Laciak et al. | |
| 4,961,917 A | 10/1990 | Byrne | |
| 5,069,886 A | 12/1991 | Frey et al. | |
| 5,211,926 A | 5/1993 | Martin et al. | |
| 5,233,934 A | 8/1993 | Krigmont et al. | |
| 5,516,497 A * | 5/1996 | Speronello et al. ..... | 423/235 |
| 5,527,755 A | 6/1996 | Wenski et al. | |
| 5,538,704 A | 7/1996 | Pham et al. | |
| 5,603,909 A | 2/1997 | Varner et al. | |
| 6,080,376 A * | 6/2000 | Iida et al. ........... | 423/239.1 |
| 6,187,278 B1 | 2/2001 | Brown et al. | |
| 6,221,325 B1 | 4/2001 | Brown et al. | |
| 6,264,905 B1 | 7/2001 | Spokoyny | |
| 6,620,393 B2 | 9/2003 | Spokoyny | |
| 2003/0202927 A1 | 10/2003 | Minkara et al. | |

FOREIGN PATENT DOCUMENTS

| | | |
|---|---|---|
| DE | 40 20 914 A1 | 1/1992 |
| EP | 0 544 282 A1 * | 6/1993 |
| EP | 0 686 423 A2 | 6/1995 |
| EP | 0 694 329 A2 | 1/1996 |
| WO | WO 2005/025724 A1 | 3/2005 |

* cited by examiner

*Primary Examiner*—Timothy C. Vanoy
(74) *Attorney, Agent, or Firm*—Melanie L. Brown; Raymond Keller; Brian W. Stegman

(57) ABSTRACT

A process is described that removes by oxidation the excess ammonia ($NH_3$) gas from flue gases that have been subjected to selective catalytic reduction (SCR) of oxides of nitrogen ($NO_x$) by ammonia injection. The inventive process incorporates a secondary catalyst of precious metal and vanadia on a metal oxide such as titania to catalyze the oxidation of both ammonia and carbon monoxide (CO) while maintaining sulfur dioxide ($SO_2$) levels.

20 Claims, 3 Drawing Sheets

AMMONIA OXIDATION CATALYST FOR THE COAL FIRED UTILITIES

FIELD OF THE INVENTION

The present invention is directed towards a process that removes by catalytic oxidation the excess ammonia ($NH_3$) gas from flue gases that have been subjected to selective catalytic reduction (SCR) of oxides of nitrogen ($NO_x$) by ammonia injection. The invention further relates to methods for the removal of residual ammonia from flue gases prior to deposition on fly ash.

BACKGROUND OF THE INVENTION

Much of the electrical power used in homes and businesses throughout the world is produced in power plants that burn a fossil fuel (i.e. coal, oil, or gas) in a boiler. The resulting hot exhaust gas (also sometimes termed "flue gas") turns a gas turbine or boils water to produce steam, which turns a steam turbine, and the turbine cooperates with a generator to produce electrical power. The flue gas stream is subsequently passed through an air preheater, such as a rotating wheel heat exchanger that transfers heat from the flue gas to an incoming air stream, which thereafter flows to the combustor. The partially cooled flue gas is directed from the air preheater to the exhaust stack.

The flue gas contains contaminants such as sulfur oxides ($SO_x$), nitrogen oxide ($NO_x$), carbon monoxide (CO) and particulates of soot when coal is used as the primary fuel source. The discharge of all of these contaminates into the atmosphere is subject to federal and local regulations, which greatly restrict the levels of these flue gas components.

To meet the reduced levels of $NO_x$ emissions from power stations, as required by environmental regulations, many fossil fuel-fired electric generating units are being equipped with either selective catalytic reduction (SCR) or selective non-catalytic reduction (SNCR) technologies. In SCR, the most common method used is to inject ammonia or urea based reagents in the presence of a vanadium oxide catalyst where the ammonia reacts to reduce the oxides of nitrogen. SCR is generally accomplished at lower temperatures than SNCR. The SCR system typically operates at flue gas temperatures ranging between 300° C. and 450° C. U.S. Pat. No. 5,104,629 illustrates one known type of SCR installation.

In SNCR, the most common method used is to inject ammonia or urea based reagents into the upper furnace to reduce the oxides of nitrogen without the use of a catalyst. The SNCR system operates at flue gas temperatures ranging between 850° C. and 1150° C. U.S. Pat. Nos. 3,900,554, 4,208,386, and 4,325,924 illustrate known types of SNCR applications.

At coal-fired power plants, ammonia injection systems for SCR and SNCR systems are typically installed in the high-temperature and high-dust region of the flue gas stream, which typically is prior to ash collection. One common problem with the SCR and SNCR technologies is that some residual ammonia, known as ammonia slip, negatively impacts downstream components and processes such as: air pre-heater fouling, fly ash contamination, and ammonia gas emission into the atmosphere. The ammonia slip problem is further exacerbated as the result of SCR catalyst surface deterioration as well as misdistribution in flue gas velocity, temperature, and concentrations of ammonia and $NO_x$.

An additional problem with the current methods is that increased ammonia injections will more efficiently remove the oxides of nitrogen, but then the excess ammonia will result in increased ammonia slip in the flue gas. In coal-fired power plants this excess ammonia can, in addition, contaminate the resulting coal based fly ash.

Even in power plants that are based on natural gas or oil, the environmental effects of the exhausted ammonia is undesirable. The EPA has enacted a variety of regulatory initiatives aimed at reducing $NO_x$. It was determined that the combustion of fossil fuels is the major source of $NO_x$ emissions. These control regulations were established by the EPA under Title IV of the Clean Air Act Amendments of 1990 (CAAA90). In July 1997 the EPA proposed another change in the New Source Performance Standards and these revisions were based on the performance that can be achieved by SCR technology.

As briefly described above, the treatment of exhaust gases from boilers and the like presents the following disadvantages:
  (1) that some ammonia is left unremoved in the treated gas;
  (2) low $NO_x$ decomposition rate; and
  (3) large ammonia consumption.

The disadvantages (1) and (2) are correlated.

For example, if the ammonia supply is increased in order to raise the $NO_x$ decomposition rate, the proportion of residual ammonia in the treated gas will be high. This residual ammonia may exceed the amounts that are permitted by existing regulations to pass into the atmosphere. Thus, the nitrogen oxide separation efficiency of the known processes is limited by the amount of unreacted ammonia that can be discharged into the atmosphere.

Besides, variation in the load on the combustion equipment will change the temperature, at the point where ammonia is introduced, to a value deviated from the optimum temperature range, and this in turn will decrease the decomposition rate, tending to increase the proportion of residual ammonia. Even in a small proportion, the residual ammonia will react rapidly with the sulfuric acid content of the exhaust gas to produce acid ammonium sulfate. This product will stick to the rear heat-transfer surface in the relatively low-temperature region, for example, to the heating surfaces of the air preheater and associated parts of a boiler, causing an increase in pressure loss, hampering the operation of the combustion equipment, and attacking the materials of the equipment for their eventual corrosion.

As described above, the ammonia left unremoved in the treated exhaust gas provides a major obstacle in the way to practical operation. Consequently, there is an upper limit to the ammonia supply and naturally the $NO_x$ decomposition rate is low. This has been a problem in the practice of high-temperature noncatalytic denitrification. Furthermore, ammonia, which is introduced in the high-temperature region, undergoes a concomitant reaction for decomposing itself, resulting in the disadvantage (3) of excess consumption of ammonia, or more than the equivalent for the $NO_x$-decomposing reaction. This tendency will be pronounced as the amount of ammonia injection is increased in anticipation of an enhanced decomposition rate. This has been another limiting factor for the rate of $NO_x$ decomposition to be attained conventionally.

It is important to accomplish the reaction of the ammonia and $NO_x$ in an efficient manner, for maximum possible reaction of both the $NO_x$ and the ammonia. If the reaction is incomplete, either $NO_x$ or ammonia (or both) may pass through to the stack and be emitted to the atmosphere. Both $NO_x$ and ammonia are classified as pollutants, and their emission is to be maintained within legal limits. Furthermore, depending upon the temperature at the cold end of the air preheater, excess ammonia slip may cause clogging of the space between adjacent air preheater heating elements because of the formation of ammonium sulfate/bisulfate, and/or agglomerated fly ash. This results in increased pressure loss of the heat exchanger, corrosion of the apparatus, and therefore unstable operation for a prolonged period and other disadvantages.

In addition, many coal-fired power plants dispose of the collected fly ash by selling it to purchasers who further process the fly ash for commercial uses (i.e. lightweight aggregate for concrete mixtures). Fly ash produced at coal-fired power plants is commonly used in concrete applications as a pozzolanic admixture and for partial replacement for cement. Fly ash consists of alumino-silicate glass that reacts under the high alkaline condition of concrete and mortar to form additional cementitious compounds. Fly ash is an essential component in high performance concrete. Fly ash contributes many beneficial characteristics to concrete including increased density and long-term strength, decreased permeability and improved durability to chemical attack. Also, fly ash improves the workability of fresh concrete.

When ammonia contaminated fly ash is used in Portland cement based mortar and concrete applications, the ammonium salts dissolve in water to form $NH_4^+$. Under the high pH (pH>12) condition created by cement alkali, ammonium cations ($NH_4^+$) are converted to dissolved ammonia gas ($NH_3$). Ammonia gas evolves from the fresh mortar or concrete mix into the air exposing concrete workers. The rate of ammonia gas evolution depends on ammonia concentration, mixing intensity, exposed surface area, and ambient temperature. While it is believed that the ammonia that evolves has no measurable effect on concrete quality (strength, permeability, etc.), the ammonia gas can range from mildly unpleasant to a potential health hazard. The human nose detects ammonia odors at levels of 5 to 10 ppm. The OSHA threshold and permissible limits are set at 25 and 35 ppm for Time-Weighted Average (TWA) (8-hr) and Short-Term Exposure Limit (STEL) (15-min), respectively. Ammonia gas concentration between 150 and 200 ppm can create a general discomfort. At concentrations between 400 and 700 ppm, ammonia gas can cause pronounced irritation. At 500 ppm, ammonia gas is immediately dangerous to health. At 2,000 ppm, death can occur within minutes.

Other than OSHA exposure limits, there are no current regulatory, industry or ASTM standards or guidelines for acceptable levels of ammonia in fly ash. However, based on industry experience, fly ash with ammonia concentration at less than 100 mg/kg does not appear to produce a noticeable odor in Ready-Mix concrete. Depending on site and weather conditions, fly ash with ammonia concentration ranging between 100 and 200 mg/kg may result in unpleasant or unsafe concrete placement and finishing work environment. Fly ash with ammonia concentration exceeding 200 mg/kg would produce unacceptable odor when used in Ready-Mixed concrete applications.

In addition to the risk of human exposure to ammonia gas evolving from concrete produced using ammonia laden ash, the disposal of ammonia laden ash in landfills and ponds at coal burning power stations could also create potential risks to humans and the environment. Ammonium salt compounds in fly ash are extremely soluble. Upon contact with water, the ammonium salts leach into the water and could be carried to ground water and nearby rivers and streams causing potential environmental damage such as ground water contamination, fish kill and eutrophication. Ammonia gas could also evolve upon wetting of alkaline fly ashes, such as those generated from the combustion of western sub-bituminous coal. Water conditioning and wet disposal of alkaline fly ashes would expose power plant workers to ammonia gas.

U.S. Pat. No. 5,233,934 to Krigmont et al. discloses a control method of reducing NOx in flue gas streams utilizing an SNCR treatment followed by an SCR treatment. The Krigmont et al. method tries to maximize the $NO_x$ removal in the SNCR stage, subject to certain ammonia slip restrictions, and injecting additional ammonia for the SCR stage.

U.S. Pat. No. 5,510,092 to Mansour et al. discloses a combined SNCR/SCR process in which SCR is employed for primary $NO_x$ reduction and $NH_3$ is injected into the SNCR zone only when the $NO_x$ content of the SCR effluent exceeds a pre-selected design maximum value.

The Minkara et al. patent application (U.S. 2003/0202927) discloses a process to reduce ammonia concentration and emissions from both coal-fired plants and plants that use other hydrocarbon fuels. The process in the Minkara et al. application adds an ammonia oxidation catalyst, specifically manganese dioxide, downstream of the SCR system to remove the undesirable ammonia slip by reacting the ammonia with the residual oxygen present in the flue gas.

As discussed above, for SCR of oxides of nitrogen with ammonia to work well and result in the lowest values of $NO_x$, it is preferable to be able to use excess ammonia. However, when the quantity of ammonia used is high enough to effectively remove the $NO_x$ through SCR, some of the excess ammonia will go through the catalyst unchanged and exit as ammonia slip in the flue gases creating the problem of a toxic reactive gas in the exiting gases. Another major problem created by the excess ammonia exiting in the flue gases, particularly from coal-fired plants, is that the ammonia contaminates the fly ash that is intended for use in mixtures with cement to make concrete. Thus, a need exists for a safe and efficient method for minimizing ammonia slip downstream from the primary SCR catalyst.

SUMMARY OF THE INVENTION

The present invention is directed to a method of removing ammonia in flue gases where ammonia is used as a selective catalytic reduction agent with a primary catalyst for reducing oxides of nitrogen. The method of this invention comprises adding ammonia to flue gases to reduce oxides of nitrogen under SCR conditions and oxidizing any unreacted ammonia with a secondary catalyst of a precious metal and vanadia on a metal oxide support to reduce the ammonia content in the flue gas. The secondary catalyst of this invention is placed downstream from the primary SCR catalyst and reduces the ammonia and CO concentrations in exiting flue gases without oxidation of $SO_2$.

One aspect of the present invention is to provide a commercially viable process that reduces the ammonia concentration to levels that will not contaminate the fly ash from coal-fired plants and will additionally reduce the present undesirable emissions level of ammonia in both coal-fired plants and plants that use other hydrocarbon fuels.

Another aspect of the present invention is to provide oxidation of both ammonia and carbon monoxide, while maintaining relatively no sulfur dioxide oxidation.

DETAILED DESCRIPTION OF THE INVENTION

Figure 1:
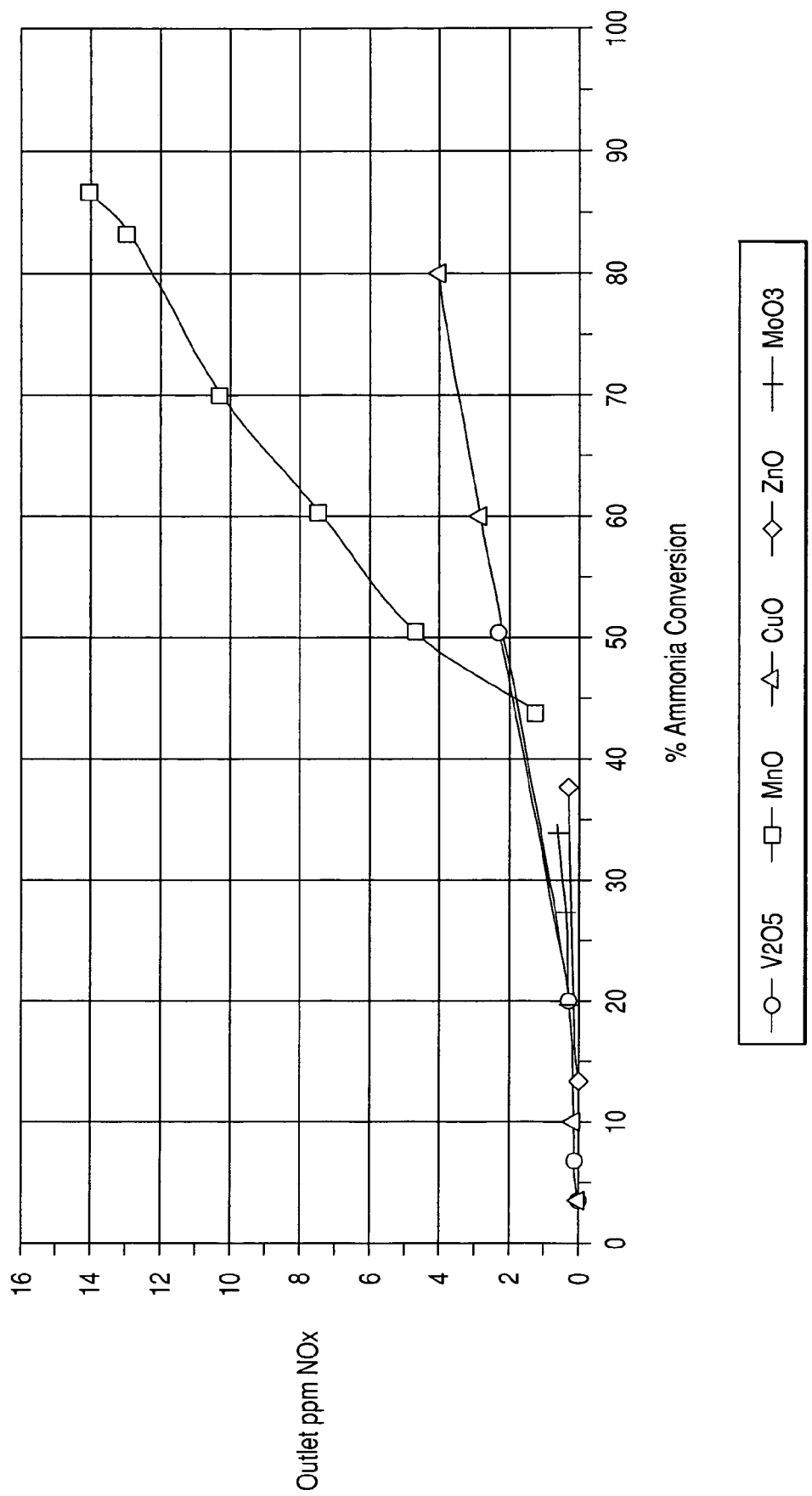
FIG. 1 depicts a graph comparing the selectivity relative to ammonia conversion of various metal oxide catalysts.

In order to reduce the emissions of nitrogen oxides from flue and exhaust gases, such as the exhaust generated by gas turbine engines in a coal-fired power plant, ammonia is added to the exhaust gas stream containing the nitrogen oxides and the gaseous stream is then contacted with a suitable catalyst at elevated temperatures in order to catalyze the reduction of nitrogen oxides with ammonia. The reduction of nitrogen oxides with ammonia to form nitrogen and $H_2O$ is catalyzed by a suitable catalyst to preferentially result in the oxidation of ammonia by the oxygen, hence the process is often referred to as the "selective" catalytic reduction ("SCR") of nitrogen oxides. SCR of nitrogen oxides can be depicted by the following reactions:

$$4NO + 4NH_3 + O_2 \rightarrow 4N_2 + 6H_2O \quad (1)$$

$$2NO_2 + 4NH_3 + O_2 \rightarrow 3N_2 + 6H_2O \quad (2)$$

The catalysts employed in the SCR process ideally should be able to retain good catalytic activity under high temperature conditions of use, for example, 400° C. or higher, under hydrothermal conditions and in the presence of sulfur compounds. High temperature and hydrothermal conditions are often encountered in practice, such as in the treatment of gas turbine engine exhausts. The presence of sulfur or sulfur compounds is often encountered in treating the exhaust gases of coal-fired power plants and of turbines or other engines fueled with sulfur-containing fuels such as fuel oils and the like.

Theoretically, it would be desirable in the SCR process to provide ammonia in excess of the stoichiometric amount required to react completely with the nitrogen oxides present, both to favor driving the reaction to completion and to help overcome inadequate mixing of the ammonia in the gaseous stream. However, in practice, significant excess ammonia over the stoichiometric amount is normally not provided because the discharge of unreacted ammonia from the catalyst would itself engender an air pollution problem. Such discharge of unreacted ammonia can occur even in cases where ammonia is present only in a stoichiometric or sub-stoichiometric amount, as a result of incomplete reaction and/or poor mixing of the ammonia in the gaseous stream. Channels of high ammonia concentration are formed in the gaseous stream by poor mixing and are of particular concern when utilizing catalysts comprising monolithic honeycomb-type substrate supports comprising refractory bodies having a plurality of fine, parallel gas flow paths extending therethrough because, unlike the case with beds of particulate catalysts, there is no opportunity for gas mixing between channels.

The reduction catalysts used are, apart from vanadium and tungsten oxide-containing titanium dioxide catalysts, also ion-exchanged zeolites such as, for example, ZSM-5, mordenite, and faujasite. An alternative SCR catalyst that may be of use is a zeolite catalyst, as disclosed in the Byrne patent (U.S. Pat. No. 4,961,917), which is herein incorporated by reference.

As indicated by the prior art of the Byrne patent, the utilization of high ratios of silica to alumina is known to enhance acid resistance of the zeolite and to provide enhanced resistance of the zeolite to acid sulfur poisoning. Generally, silica to alumina ratios well in excess of the minimum of 10 may be employed. High conversion efficiencies of over 90% for $NO_x$ reduction with ammonia have been attained with fresh copper promoted beta zeolites having silica to alumina ratios of at least 20. Conversion efficiencies of over 75% have been attained by a fresh copper promoted ZSM-5 zeolite having a silica to alumina ratio of 46. However, fresh copper promoted USY zeolites with silica to alumina ratios of, respectively, 8 and 30 provided 85% and 39% conversions of $NO_x$, suggesting that at least for USY, silica to alumina ratios should be significantly less than 30.

However, resistance to short term sulfur poisoning and the ability to sustain a high level of activity for both the SCR process and the oxidation of ammonia by oxygen has been found to be provided by zeolites which also exhibit pore sizes large enough to permit adequate movement of the reactant molecules NO and $NH_3$ into, and the product molecules $N_2$ and $H_2O$ out of, the pore system in the presence of sulfur oxide molecules resulting from short term sulfur poisoning, and/or sulfate deposits resulting from long term sulfur poisoning. The pore system of suitable size is interconnected in all three crystallographic dimensions. As is well known to the those skilled in the zeolite art, the crystalline structure of zeolites exhibits a complex pore structure having more or less regularly recurring connections, intersections and the like. Pores having a particular characteristic, such as a given dimension diameter or cross-sectional configuration, are said to be one dimensional if those pores do not intersect with other like pores. If the pores intersect only within a given plane with other like pores, the pores of that characteristic are said to be interconnected in two (crystallographic) dimensions. If the pores intersect with other like pores lying both in the same plane and in other planes, such like pores are said to be interconnected in three dimensions, i.e., to be "three dimensional". It has been found that zeolites which are highly resistant to sulfate poisoning and provide good activity for both the SCR process and the oxidation of ammonia with oxygen, and which retain good activity even when subject to high temperatures, hydrothermal conditions and sulfate poisons, are zeolites which have pores which exhibit a pore diameter of at least about 7 Angstroms and are interconnected in three dimensions. The Byrne patent discloses that the interconnection of pores of at least 7 Angstroms diameter in three dimensions provides for good mobility of sulfate molecules throughout the zeolite structure, thereby permitting the sulfate molecules to be released from the catalyst to free a large number of the available adsorbent sites for reactant $NO_x$ and $NH_3$ molecules and reactant $NH_3$ and $O_2$ molecules. Any zeolites meeting the foregoing criteria are suitable for use in the practices of the present invention; specific zeolites that meet these criteria are USY, Beta and ZSM-20. Other zeolites may also satisfy the aforementioned criteria.

The primary SCR catalyst can be any form of catalyst known in the industry that reduces oxides of nitrogen. For the purpose of nitrogen oxide reduction, it is preferred to have an extruded homogeneous catalyst. One such embodiment is an extruded homogeneous honeycomb catalyst containing a mixture of vanadia and titania and, optionally, tungsten. Such catalysts are well known within the industry and provide ammonia slip values from about 5 ppm to about 10 ppm. Catalyst-coated honeycombs or plates can also be used.

The present invention incorporates a secondary ammonia oxidation catalyst that is located downstream from the primary SCR catalyst. In this manner, ammonia slip that passes through the SCR catalyst will be oxidized as the ammonia passes through the secondary catalyst. The secondary catalyst must possess several beneficial features, including; reducing the ammonia slip to lower levels (2 ppm or less) under flue gas conditions that have very low amounts of oxygen (about 2%), reducing CO levels and substantially maintaining $SO_2$ levels. Ammonia oxidation occurs by the following reactions:

$$4NH_3 + 3O_2 \rightarrow 2N_2 + 6H_2O \quad (3)$$

$$2NH_3 + 2O_2 \rightarrow N_2O + 3H_2O \quad (4)$$

$$4NH_3 + 5O_2 \rightarrow 4NO + 6H_2O \quad (5)$$

The invention disclosed herein adds a highly efficient secondary catalyst, an ammonia oxidation catalyst, downstream of the SCR system to remove the undesirable ammonia slip by reacting it with the residual oxygen present in the flue gas. Surprisingly, it has been found that certain secondary catalysts could be used for this purpose even though there were only small amounts of residual oxygen in the flue gas. At temperatures varying from about 300 to 450° C., high conversion of ammonia can be achieved while producing only low levels of NOx.

Exhaust gas streams that can be treated in accordance with this invention often inherently contain substantial amounts of oxygen. For example, a typical exhaust gas of a turbine engine contains from about 2 to 15 volume percent oxygen and from about 20 to 500 volume parts per million nitrogen oxides, the latter normally comprising a mixture of NO and $NO_2$. Usually, there is sufficient oxygen present in the gaseous stream to oxidize residual ammonia, even when an excess over the stoichiometric amount of ammonia required to reduce all the nitrogen oxides present is employed. However, in cases where a very large excess over the stoichiometric amount of ammonia is utilized, or wherein the gaseous stream to be treated is lacking or low in oxygen content, an oxygen-containing gas, usually air, may be introduced between the first catalyst zone and the second catalyst zone, in order to insure that adequate oxygen is present in the second catalyst zone for the oxidation of residual or excess ammonia.

It is desired that the secondary ammonia oxidation catalyst placed downstream from the SRC catalyst have the following criteria:

(a) a material capable of oxidizing ammonia at flue gas temperatures, oxygen concentration, and flow rates;

(b) a material capable of functioning in the presence of oxides of sulfur and nitrogen;

(c) a material that will produce minimal oxides of nitrogen by side reactions of the oxidation of ammonia;

(d) a material that will increase the reduction of $NO_x$ such that the exiting levels of ammonia would be 2 ppm or less;

(e) a material that will reduce levels of CO; and (f) a material that will maintain $SO_2$ levels.

Figure 2:
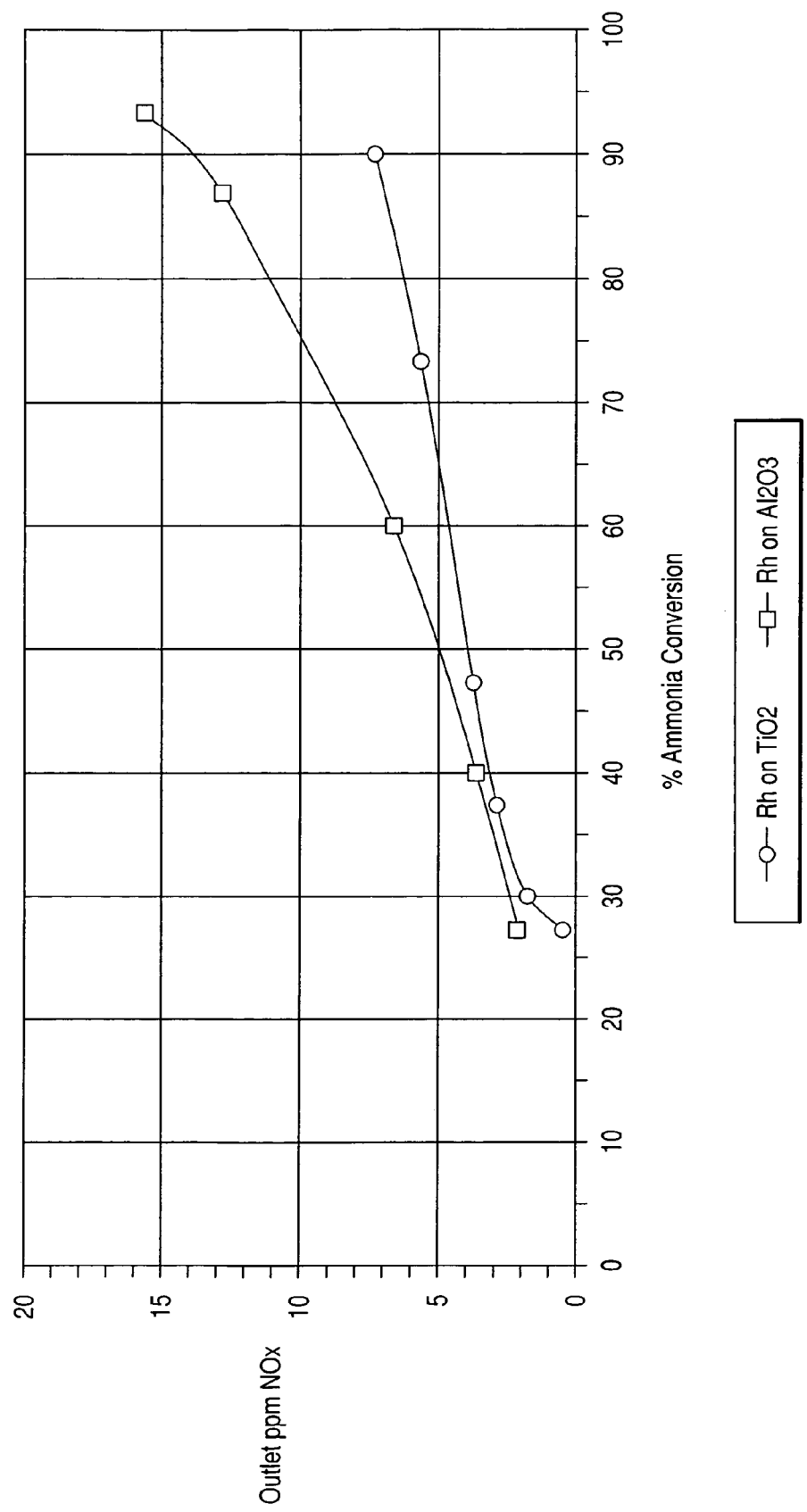
FIG. 2 depicts a graph comparing the selectivity relative to ammonia conversion using titania and alumina supports.

The secondary catalyst is located downstream from the SCR catalyst that is responsible for reducing the nitrogen oxides. The secondary catalyst of this invention comprises a precious metal and vanadia on a metal oxide support. Titania is the preferred metal oxide support, although other metal oxides can be used as the support, including alumina, silica, alumina-silica, zirconia, magnesium oxide, hafnium oxide, lanthanum oxide, etc. Experimental data, as depicted in FIG. 2, has shown titania to be more selective than alumina for ammonia conversion to nitrogen. Titania appears to create less nitrogen oxides than does an alumina substrate.

Precious metals such as platinum, palladium, rhodium or gold can be used. Platinum has been found to be the most active of the precious metals, and thus platinum is preferred. The precious metal can be incorporated onto the titania substrate by dispersing a compound and/or complex of one or more precious metals onto a titania bulk support material. As used herein, the term "compound" means any salt, complex, or the like of a catalytically active component (or "catalytic component") which, upon calcination or upon use of the catalyst, decomposes or otherwise converts to a catalytically active form, which is often, but not necessarily, an oxide. The compounds or complexes of one or more precious metal catalytic compounds may be dissolved or suspended in any liquid which will wet or impregnate the support material, which does not adversely react with other components of the catalytic material and which is capable of being removed from the catalyst by volatilization or decomposition upon heating and/or the application of a vacuum. Generally, both from the point of view of economics and environmental aspects, aqueous solutions of soluble compounds or complexes are preferred. For example, suitable water-soluble platinum group metal compounds are chloroplatinic acid, amine solubilized platinum hydroxide, rhodium chloride, rhodium nitrate, hexamine rhodium chloride, palladium nitrate or palladium chloride, etc. The compound-containing liquid is impregnated into the pores of the bulk support titania particles of the catalyst, and the impregnated material is dried and preferably calcined to remove the liquid and bind the platinum group metal into the support material. In some cases, the completion of removal of the liquid (which may be present as, e.g., water of crystallization) may not occur until the catalyst is placed into use and subjected to the high temperature exhaust gas. During the calcination step, or at least during the initial phase of use of the catalyst, such compounds are converted into a catalytically active form of the platinum group metal or a compound thereof. An analogous approach can be taken to incorporate the vanadium component into the titania support material. For example, vanadium salts, such as vanadyl oxalate, are well known and can be used to incorporate vanadium onto the titania support. Moreover, any useful metal oxide support can be substituted for the titania support material.

Typically, the secondary catalyst in the form of the precious metal/vanadia on titania is applied onto a substrate. The structure of the substrate for the secondary catalyst, as with that of the primary catalyst, may be any form known in the art. Typically, the substrate comprises a foraminous member, often referred to as a "honeycomb" substrate support, comprising one or more refractory bodies having a plurality of fine, parallel gas flow passages extending therethrough. Such substrate supports are well known in the art and may be made of any suitable material such as ceramic or metal. Cordierite honeycombs are preferred. Such a honeycomb may contain from about 11 to about 64 individual cells, with 64 cells being preferred.

The secondary catalyst may be in the form of a particulate or a coating on a ceramic or metal structure, such as the above mentioned honeycomb structure. The catalysts of the present invention may also be provided in the form of extrudates, pellets, tablets or particles of any other suitable shape, for use as a packed bed of particulate catalyst, or as shaped pieces such as plates, saddles, tubes or the like.

A variety of deposition methods are known in the art for depositing the catalyst on a foraminous substrate. Methods for depositing the catalyst on the foraminous substrate include, for example, disposing the catalyst in a liquid vehicle to form a slurry and wetting the foraminous substrate with the slurry by dipping the substrate into the slurry, spraying the slurry onto the substrate, etc. The catalytic components of precious metal and vanadia on titania are typically present in amounts of from about 1.0 g to about 2.5 $g/in^3$ relative to the substrate, such as a honeycomb substrate. The amount of precious metal generally ranges from about 0.1 to 2.0% by weight relative to the metal oxide support, such as titania.

Preferred amounts of the precious metal will range from 0.7 to 1.5 wt. %. Vanadia will generally be present in amounts of from about 1.0 to 10 wt. % of the metal oxide support.

EXAMPLE 1

In this example, sample catalysts comprising various metal oxides impregnated onto a titania support of about 90 m²/g surface area were prepared. The metal oxides were $V_2O_5$, MnO, CuO, ZnO, and $MoO_3$.

Preparation of the vanadium/titania catalyst was performed as follows:
1. A 13 wt. % Vanadyl Oxalate solution in water was further diluted with 7.28 g of water
2. 193.7 g of titania from Millenium were impregnated with 142.86 g of the Vanadyl Oxalate solution
3. The impregnated titania powder was dried and calcined at 400° C. for 2 hours All other metal oxide catalysts were prepared with the same procedure as above. Table 1 below sets forth the weights of the materials.

TABLE 1

|  | TiO₂ (g) | H₂O (g) |
|---|---|---|
| Ammonium Heptamolybdate tetrahydrate (25.49 g) | 193.68 | 125.37 |
| Zinc sulfate heptahydrate (57.11 g) | 193.68 | 106.4 |
| Manganese Nitrate (80.72 g) | 193.68 | 83.02 |
| Copper sulfate heptahydrate (51.25 g) | 193.68 | 93.77 |

EXAMPLE 2

In this example, catalysts comprising precious metal on titania and precious metal on alumina were prepared.

The titania support used herein was that of Example 1. The alumina support comprised SBA150 from Alcoa. The alumina support had a surface area of about 150 m²/g.

1.89 g of an 18.2% Pt"A" solution (Dihydrogen hexahydroxyplatinate (IV) dissolved in monoethanolamine) was diluted with 111.34 g of water. 205.84 g of titania was impregnated with the Pt solution. The powder was then dried and calcined at 400° C. for 2 hours. The other catalysts were prepared in the same manner. The amount of materials used are listed in Table 2 below.

TABLE 2

|  | TiO₂ (g) | H₂O (g) |
|---|---|---|
| Pt "A" (1.87 g) | 205.84 | 111.34 |
| Palladium Nitrate (1.75 g) | 205.84 | 111.46 |
| Rhodium Nitrate (1.75 g) | 205.84 | 112.24 |

|  | Alumina (g) | H₂O (g) |
|---|---|---|
| Pt "A" (1.87 g) | 201.68 | 109.06 |
| Palladium Nitrate (1.75 g) | 201.68 | 109.17 |
| Rhodium Nitrate (3.35 g) | 210.17 | 112.24 |

EXAMPLE 3

In this example, the preparations of honeycomb catalysts using the PM impregnated alumina powder of Example 2 are described.

A slurry was prepared by ball milling 41 g of each of the PM impregnated alumina powders prepared in Example 2, 49 g of water and 10 g of acetic acid to a particle size of 10 microns or less. A 64 cpsi honeycomb was then coated with the slurry to 1.7 g/in³ loading after calcining. The coated honeycomb was then dried and calcined at 500° C. for 1 hour.

EXAMPLE 4

Preparations of honeycomb catalysts using the PM impregnated titania powder of Example 2 are described.

A slurry was prepared by ball milling 35 g of each of the PM impregnated titania powders prepared in Example 2 and 65 g of water to a particle size of 10 microns. A 64 cpsi honeycomb was then coated with the slurry to 1.7 g/in3 loading after calcining. The honeycomb was calcined at 400° C. for 1 hour.

EXAMPLE 5

The performance of the honeycomb catalysts described in Examples 3 and 4 for ammonia conversion was evaluated with a gas stream containing 25 ppm CO, 15 ppm ammonia, 15% oxygen, 10% water and 2.5 ppm NOx. The ammonia and CO conversion was recorded between 300° C. to 500° C.

% conversion was calculated via equation 1:

$$\% \text{Conv} = [(NH_3 \text{ in} - NH_3 \text{out})/NH_3 \text{ in}]*100 \quad (1)$$

The $NH_3$ was measured using the phoacoustic multigas analyzer model 1312 from Air Tech Instruments. The NOx analyzer was the 600HCLD analyzer from California Analytical instruments.

FIG. 1 illustrates the amount of NOx formed relative to the percent ammonia conversion using honeycombs (Example 4) formed from the powders of Example 1. From FIG. 1, it can be seen that the vanadium oxide, zinc oxide, and molybdenum oxide were very selective for converting the ammonia to nitrogen, as very little NOx was formed. On the other hand, the manganese oxide and copper oxides were more active with respect to converting the ammonia, but a higher percentage of the ammonia was converted to NOx utilizing these two catalysts.

FIG. 2 graphs results of ammonia conversion relative to outlet of NOx produced by directing the gas stream over respective honeycombs prepared in Examples 3 and 4 from the rhodium powder catalysts produced in Example 2. As can be seen, the activity of both catalysts were very similar. However, the rhodium on titania catalyst was substantially more selective for converting the ammonia to nitrogen as at the higher conversion, the rhodium on alumina catalyst yielded a greater amount of NOx components.

EXAMPLE 6

Figure 3:
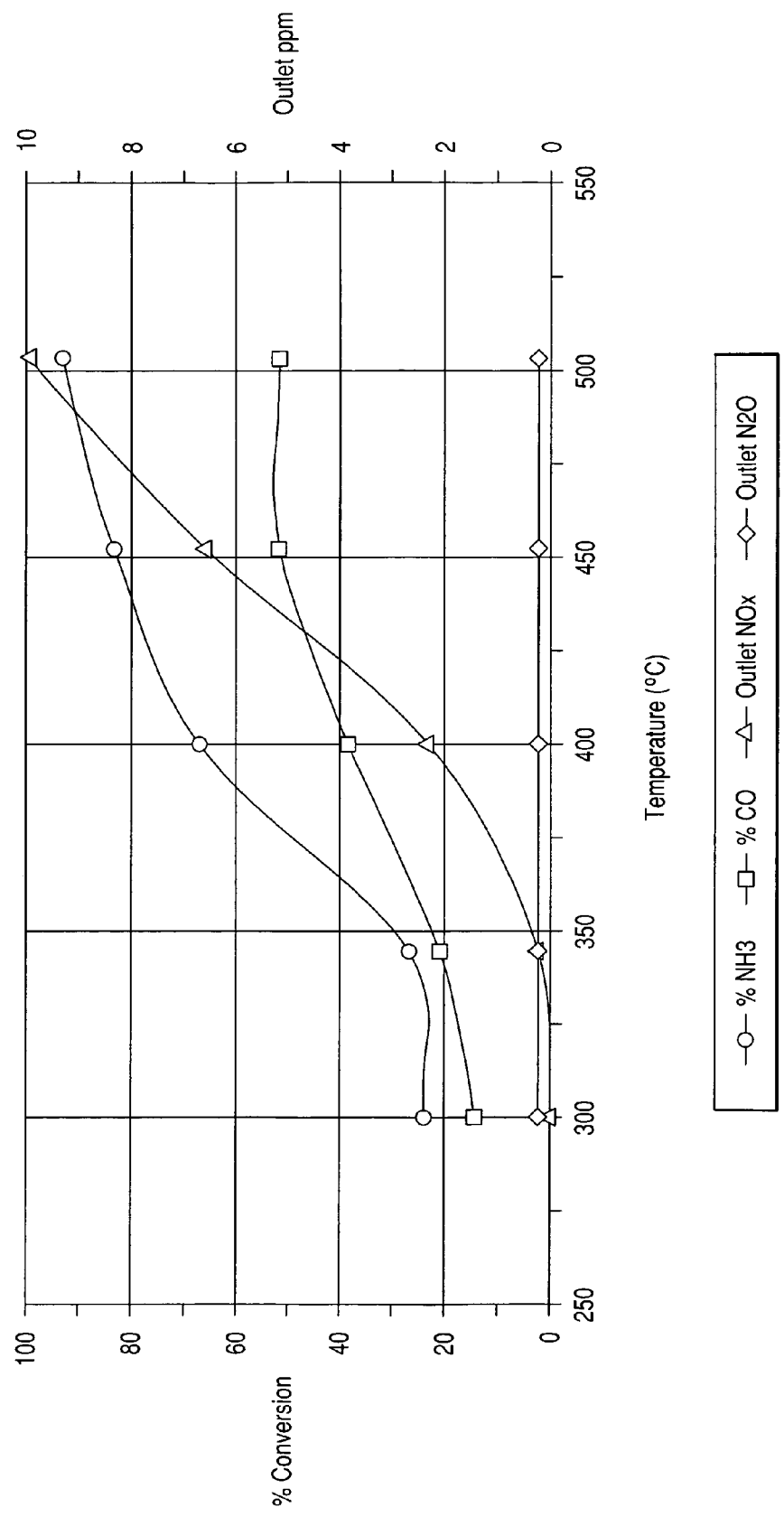
FIG. 3 depicts a graph comparing the conversion of ammonia and CO at various temperatures (° C.) using a secondary catalyst in accordance with this invention.

A catalyst powder of vanadia on titania as prepared in Example 1 was coated onto a honeycomb as described in Example 4. 2 g/ft³ of platinum was impregnated onto the coated honeycomb. The Pt-treated honeycomb was tested for ammonia conversion at various temperatures. The results of testing are shown in FIG. 3. As shown in FIG. 3, as the temperature was increased from 300° C. to 500° C., the ammonia conversion increased from over 20 to just over 80%, whereas the carbon monoxide had a conversion rate to carbon dioxide of from just under 20% at 300° C. and over 50% at 450° C. As the temperature increased, however, the amount of NOx produced significantly increased. Accordingly, it is desired to maintain the temperature of the ammonia oxidation at below 500° C., preferably from about 300 to about 450° C., and more preferably from 300 to 400° C.

The above presents a description of the best mode of carrying out the present invention and the manner and process of making and using the same. This invention is, however, susceptible to modifications and alternate constructions from that discussed above which are fully equivalent. Consequently, it is not the intention to limit this invention to the particular embodiments disclosed herein. On the contrary, the intention is to cover all modifications and alternate constructions coming within the spirit and scope of the invention as generally expressed by the following claims, which particularly point out and distinctly claim the subject matter of the invention.

What is claimed is:

1. A method of removing ammonia in flue gases, where ammonia is used as a selective catalytic reduction agent with a primary catalyst for reducing oxides of nitrogen, which comprises the steps of:
   a. adding ammonia to flue gases and reducing oxides of nitrogen in the presence of said primary catalyst to produce a treated flue gas having a NOx content less than said flue gases and containing unreacted ammonia;
   b. contacting said treated flue gas with a secondary ammonia oxidation catalyst to reduce the amount of ammonia, said secondary catalyst comprising a precious metal and vanadia on a titania alumina, silica, alumina-silica, zirconia, magnesium oxide, hafnium oxide, or a lanthanum oxide support.

2. The method of claim 1, wherein said support is titania.

3. The method of claim 1, wherein said precious metal is selected from the group consisting of platinum, palladium, rhodium and gold.

4. The method of claim 1, wherein said precious metal is platinum.

5. The method of claim 1, wherein said secondary catalyst is applied onto a substrate in the form of a honeycomb.

6. The method of claim 1, wherein said treated flue gas is contacted with the secondary catalyst at temperatures from about 300° C. to about 450° C.

7. The method of claim 1, wherein a source of oxygen is added to said treated flue gas prior to contact with said secondary catalyst.

8. The method of claim 5, wherein said secondary catalyst is present in a range of about 1.0 gram to about 2.5 grams per cubic inch of said substrate.

9. The method of claim 1, wherein said primary catalyst is vanadia and, optionally, tungsten oxide on titania.

10. The method of claim 9, wherein said primary catalyst is a homogeneous extrudate.

11. The method of claim 1, wherein said flue gases are obtained from the combustion of coal.

12. The method of claim 2, wherein said precious metal is platinum.

13. The method of claim 2, wherein said secondary catalyst is applied onto a substrate in the form of a honeycomb.

14. The method of claim 2, wherein said treated flue gas is contacted with the secondary catalyst at temperatures from about 300° C. to about 450° C.

15. The method of claim 2, wherein a source of oxygen is added to said treated flue gas prior to contact with said secondary catalst.

16. The method of claim 13, wherein said secondary catalyst is present in a range of about 1.0 gram to about 2.5 grams per cubic inch of said substrate.

17. The method of claim 1, wherein said precious metal is present in amounts of about 0.1 to 2.0 wt. % relative to said support.

18. The method of claim 1, wherein said vanadia comprises from about 1.0 to 10 wt. % of said support.

19. The method of claim 16, wherein said precious metal is present in amounts of about 0.1 to 2.0 wt. % of said titania.

20. The method of claim 19, wherein said vanadia is present in amounts of about 1.0 to 10 wt. % of said titania.

* * * * *